Dec. 23, 1969   M. H. ROMAN   3,485,086
ABNORMAL MILK INDICATOR
Filed Feb. 13, 1967

INVENTOR.
MICHAEL H. ROMAN.
BY
ATTORNEY

United States Patent Office 3,485,086
Patented Dec. 23, 1969

3,485,086
ABNORMAL MILK INDICATOR
Michael H. Roman, 18 Eugene St., Lowville, N.Y. 13367
Filed Feb. 13, 1967, Ser. No. 615,497
Int. Cl. G01n *11/00*
U.S. Cl. 73—61                                          3 Claims

ABSTRACT OF THE DISCLOSURE

An abnormal milk indicator having four like receptacles to receive milk sample from each udder quarter of a cow. A filter is disposed beneath each receptacle and above a common receiving chamber. A vacuum source is connected to the receiving chamber to draw simultaneously each udder quarter's sample through a separate portion of the filter. Pus, slime or the like indicating infection or abnormal milk secretion will be trapped on the filter and block or restrict flow through it enabling at a glance to determine abnormality of individual udder quarters.

---

Figure 1:
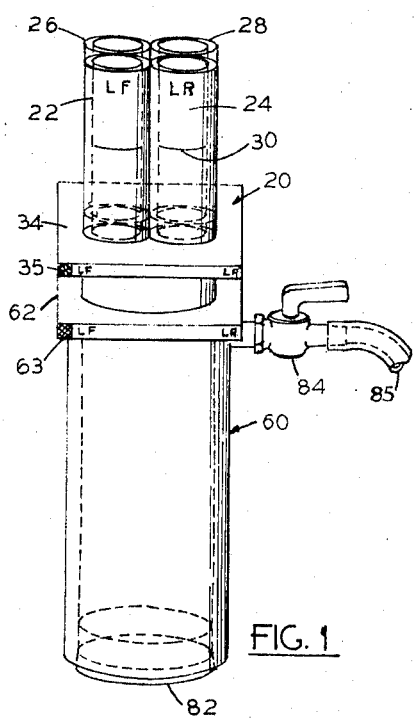

This invention relates to milk testing, and more particularly to an indicator for abnormal milk, for use at the source, namely each cow, and each udder quarter of the cow.

It is a usual and desirable practice to require that a small amount of milk be withdrawn initially from each quarter of the udder of a cow and discarded before proceeding further with the milking of the cow. Such practice tends to eliminate, in so far as healthy cows are concerned, any undesirable or objectionable contaminants usually found in the initial few milliliters of milk as taken from the teat of each udder quarter. The milk obtained from each quarter of a healthy cow does not usually differ substantially from that drawn from the other udder quarters of the cow. Generally speaking, a cow whose milk is abnormal, at the initial stages, may show the abnormality in the milk drawn from one quarter of its udder, before the abnormality spreads to the adjacent quarter or quarters. It is desirable for the dairyman to be promptly aware of a cow that is developing an abnormality, an infection, or that has been injured, and such abnormality usually shows up first in the milk withdrawn from one quarter of the udder before the abnormality spreads to the other quarters. Such abnormality will most likely appear from milk initially drawn from one quarter, in the form of slime like substance, high leucocyte count or level, or foreign and objectionable matter. It is important in the dairy industry that any abnormally in a cow of a herd be discovered immediately so that the milk from such cow will not be mixed with and contaminate the milk supply from healthy cows. It is also important for the dairyman to known immediately of any disorder, so that treatment may be commenced at the early stages before the infection gets out of hand in the particular cow, or spreads to the other members of the herd.

The present invention is directed to a handy apparatus that is effective in indicating abnormal milk. The apparatus is adapted to utilize the few milliliters of milk which the daryman initially withdraws from each cow before continuing the milking operation. The apparatus more particularly comprises four small receptacles, one for each teat of a cow, within which the preliminary few milliliters from each teat can be collected. The four initial samples thus collected in the four receptacles are then drawn through a filter disk by differential pressure applied simultaneous to ports in the bottoms of the four receptacles. The specimens from the four quarters of the udder of a healthy cow pass almost instantly through the filter disk into a chamber below the filter, all four receptacles being emptied at about the same rate.

Should one quarter of an udder be infected, the initial specimen from that quarter will contain leucocytes, or other associated substances to a much greater extent than the specimens drawn from the other quarters of the udder, so as to block the flow from such receptacles through the filter, thus delaying or preventing the differential pressure from emptying the particular receptacle. In this manner a prompt comparison indication and warning is provided, so that the dairyman can eliminate the particular cow from the herd for treatment, treat the udder quarter indicated to be abnormal, and thus save the milk from the remaining healthy cows from contamination.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 2:
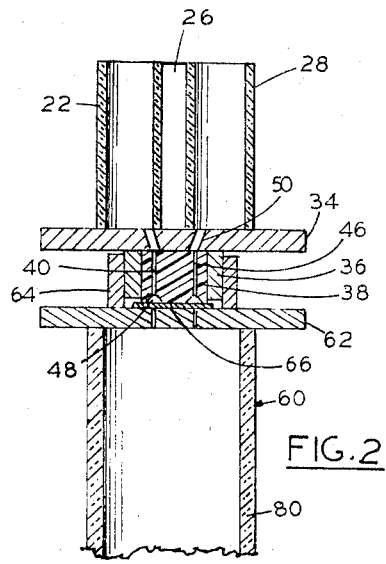
Figure 3:
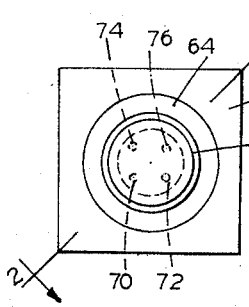
Figure 4:
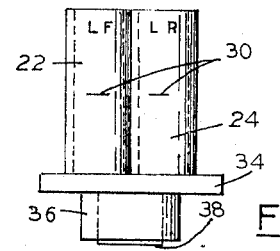
Figures 6, 7:
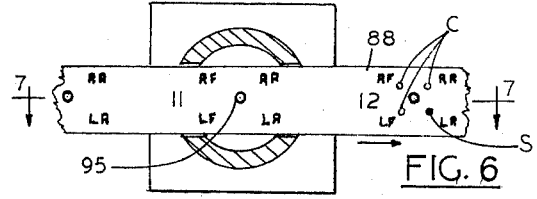
Figure 5:
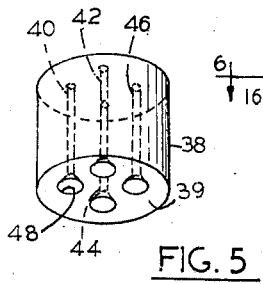

In the drawings wherein like reference characters indicate like parts:

FIGURE 1 is a front elevational view of the apparatus;
FIGURE 2 is a sectional view of the apparatus taken on a diagonal, such as the line 2—2 in FIGURE 3;
FIGURE 3 is a top plan view of the lower half of the apparatus;
FIGURE 4 is a side view of the upper half of the apparatus;
FIGURE 5 is an enlarged to full size perspective view from beneath, of the resilient plug;
FIGURE 6 is a sectional view of a modified lower portion of the apparatus, taken substantially on the line 6—6 of FIGURE 7, and
FIGURE 7 is a section of the apparatus of FIGURE 6, taken on the line 7—7 of FIGURE 6, the filter strip being removed.

In FIGURES 1 and 2 of the drawings there is shown a two part apparatus for comparing initial samples or specimens of milk from the four quarters of the udder of a cow. The upper portion 20 of the apparatus comprises four like receptacles 22, 24, 26, and 28, each being adapted when about half full to receive about 10 milliliters of milk from the teat of each quarter of the udder of a cow. The receptacles are labeled LF and LR for the left front or left rear teat or udder quarter, and RF and RR for the right front or right rear teat or udder quarter, so that after the test samples are taken, any particular udder quarter indicated by the apparatus to be abnormal will be known, so that the treatment can be concentrated in the proper quarter area. Each of the receptacles may be graduated as at 30 to indicate a suitable test sample, for example, 10 milliliters, or several graduations may be applied on each receptacle.

The receptacles extend upwards from a base 34, which may be square, and likewise have inscriptions such as LF, LR, RF or RR in correspondence with the adjacent receptacles 22, 24, 26 and 28. The base on the underside is provided with a annular collar 36 in which is positioned a resilient plug 38 of rubber or the like, the plug being axially thicker than the height of the collar 36. The plug is provided with four like ports 40, 42, 44 and 46, each terminating in a flare or connical enlargement 48 at their lower ends, and connecting ports 50 through the base 34 connect each part 40, 42, 44 and 46 with one of the receptacles respectively. The plug 38 is removable, and when inserted in position, the ports 40, 42, 44 and 46 are disposed so as to align with the four ports 50 leading to the receptacles 22, 24, 26, and 28.

The lower portion of the apparatus 60, comprises a base 62 which may correspond to the base 34, in so far as its perimetral shape is concerned. Upstanding on the base is a collar 64 adapted to telescopically receive the collar 34. The internal diameter of the collar 64 is such as to permit the placement of a filter disk 66 upon the upper surface of the base 62, the disk preferably being larger in diameter than the diameter of the plug 38. The base 62 is provided with four ports 70, 72, 74 and 76 adapted to be aligned with the ports 60 in base 34, and the ports 40, 42, 44 and 46 of the plug 38. The collar 64 is of less height than the actual length of the plug 38 and the thickness of the filter disk combined so as to permit the lower plug surface 39 to engage the filter disk and form a uniform contact therewith over its entire area.

Depending from the base 62 is a tubular chamber 80, having a removable plug 82 in the bottom, and a valved fitting 84, to connect the chamber to a source of vacuum as by hose 85. Such valve when in off positions may have a vent to the chamber 80, so that at the start of taking samples, the chamber 80 will be under atmospheric pressure.

All of the parts may be made of clear plastic, and the upper and lower portions may each be molded in one piece. The upper open ends of the receptacle 22, 24 and 26 and 28 may be provided with funnel like flares to facilitate squirting milk from a teat thereinto and assure that only milk from the teat of one udder quarter is introduced into a particular receptacle. Such receptacles may be in the form of a chamber with partitions to form the four receptacles. From the foregoing, it will be seen that the apparatus is assembled as indicated in FIGURES 1 and 2, with a filter disk 66, in position, which may be of the white dense cotton fiber type, and with the plug 38 bearing thereagainst. In assembling, the top portion is oriented with respect to the lower portion so that the four areas on the filter disk can be examined in relation to the particular udder quarter. With the valve 84 cut off, and the chamber 82 vented, a test specimen of about 10 milliliters is drawn from the left front teat or udder quarter and collected in receptacle 22, a second test specimen of like amount is drawn from the left rear teat or udder quarter and collected in receptacle 24, and a third and fourth specimen of the same quantity is drawn from the right front and right rear teat and corresponding quarters, and collected in receptacles 26 and 28 respectively.

With all receptacles containing specimens of a like amount, the valve 84 is manipulated to apply vacuum to the chamber 82. Such vacuum supply is generally handy to milking operations in the dairy stable. If all speciments are alike as to quantity and quality, they will all be quickly drawn through the filter disk into the chamber 82. If, however, an udder quarter is infected, the presence of high leucocyte levels and associated matter will be sufficient in the test specimen from that quarter to block the flow at the filter and prevent the flow of the specimen into the lower chamber, while the specimens of the other udder quarters will promptly be drawn into the chamber 82. Thus by the failure of a receptacle to empty in comparison to the others, the dairyman is at once apprised of an abnormality. By utilizing the test each day or at frequent intervals, an infection at its early stages is strikingly evidenced, and the dairyman is able to protect his milk production from contamination by immediately segregating the cow from the herd. He can immediately commence treatment of the cow, and inspect the filter disk, in the blocked area, for an indication of the nature of the difficulty and to thereby assist in determining the remedy.

In practice, the receptacles 22, 24, 26 and 28 may have an interval diameter of about ¾", and the filter disk may have a diameter of 1¼". The ports 40, 42, 44 and 46, and 70, 72, 74 and 76 may be about ⅟₁₆" in diameter and spaced apart a half inch, and the plug 38 may be about 1 inch in diameter and ¾ of an inch thick. The chamber 82 will be of sufficient size to hold the milk specimens of a plurality of cows, after running through the filter disk; so that emptying of the chamber will not be required so frequently.

Since a new filter disk should be used with each cow and changing disks for each cow takes time, the apparatus can be modified as in FIGURES 6 and 7 to employ a strip 88 of filter material, the strip being about as wide as the diameter of the plug 38 and being fed through slots 90 and 92 on opposite sides of the collar 164 adjacent to the base 162. Such strip can be inscribed at intervals to orient the test spots with the respective udder quarters, and numbered so as to indicate a sequence of cows correspondingly numbered as shown. To facilitate drawing off any specimen the flow of which has been blocked by scum at the filter test area or spot, the base may have a central aperture 94 of a diameter not greater than a quarter inch, and by lifting the plug slightly, while the chamber is under vacuum, any specimen, the flow from which was block by the ⅟₁₆" port in the base 162, can be caused to flow to the center area, and be quickly sucked into the chamber below, and thus the receptacle or receptacles are cleared for the next cow. To facilitate such action the filter strip may be provided with a small central perforation 95 at each test interval therealong, so that clearing any specimen from a receptacle, after the test, would not be subject to filtration and blocking by the accumulation of the abnormal secretion at the filter. It would be preferable, at least as often as the chamber 80 requires emptying, to clean the receptacles 22, 24, 26 and 28, and highly desirable to clean the receptacles whenever a comparison indication appears, evidencing an abnormal condition.

In FIGURE 6, the right hand end of the filter strip 88 is shown as it might appear after a test, where the flow of the samples from the LF, LR, and RR udder quarters are reasonably free and clear, and left discernible light spots such as C on the filter, whereas flow from the LR, or the left rear udder quarter, was accompanied by slime-like substance indicated by the dark spot at S, which blocked or restricted the flow, so that the resulting slower rate of flow from receptacle 24 at once indicated likely abnormality in the left rear udder quarter. The flares 48 in the plug 38 determine the size of the spots.

The apparatus can be used in connection with cows which have been subject to treatment, to determine whether the treatment has been effective, since a test of a cow with the apparatus would result in the rapid flow of the samples from all of the receptacles, which is an indication that cow likely has recovered.

When the apparatus of FIGURES 1-5 is used, it is desirable to clean the receptacles 22, 24, 26 and 28 and to employ a new filter disk for each cow. The receptacles must be cleaned and a new disk employed, before reuse whenever the apparatus indicates an abnormal condition.

Assembly of the two parts with correct orientation can be facilitated by providing an etched or colored corner area as at 35 and 63, on each of the bases 34 and 62, since the indicia LF, LR, FR and RR may be difficult to read under some circumstances.

While a single modification with a slight variation of the invention has been illustrated and described, it is to be understood that the invention is not limited thereto. Various changes in the construction and arrangement may be made without departing from the spirit of the invention, as will be apparent to those skilled in the art.

What is claimed is:

1. A milk testing apparatus comprising separate receptacle means for collecting a milk sample from each udder quarter of a cow separate from the other udder quarters of the cow, a separate sample withdrawal conduit for each receptacle, like test filter means interposed in each conduit and adapted to restrict flow, and pressure differential means for substantially simultaneously applying like pressure to said conduits to urge withdrawal of the separate samples from the receptacle means through the test filter means, said apparatus comprising an upper portion and a lower portion, said upper portion comprising a base having four like open top receptacles upstanding from the base and arranged to conveniently receive separate samples of milk from the four udder quarters of a cow, said lower portion of the apparatus having a lower base having conduits comprising four ports and a surface adapted to receive filter means overlying said ports, filter means overlying said ports and individual port means leading from each receptacle of the upper portion to the filter means of the lower portion with each port means in alignment with one of the lower base ports respectively, and means for applying differential pressure to milk samples in each of the receptacles and said lower base ports to urge flow of each of said samples through filter means associated with each lower base port, whereby the rate of flow of one sample from any one of the receptacles may be compared with the rates of flow or lack of flow of the other samples from any of the other receptacles.

2. Milk testing apparatus according to claim 1 wherein the apparatus comprises an upper portion and a lower portion, said upper portion comprising a base having four like open top receptacles upstanding from the base and arranged to conveniently receive separate samples of milk from the four udder quarters of a cow, said lower portion of the apparatus having a lower base, a common chamber affixed to the underside thereof, a closure for the lower end of the chamber, and means for venting and applying vacuum to the chamber, said lower base having four conduits comprising ports therein and a surface adapted to receive filter means overlying said ports, filter means overlying said ports and individual port means leading from each receptacle of the upper portion to the filter means of the lower portion, with each port means in alignment with one of the lower base ports respectively, whereby four samples of like quantity from the separate udder quarters of a cow in the four receptacles may be subjected to differential pressure to urge such milk samples through the filter means to compare the rate of flow into the chamber of a sample in one receptacle with the rate of flow into the chamber of the other receptacle samples.

3. Milk testing apparatus according to claim 1 wherein the apparatus comprises an upper portion and a lower portion, said upper portion comprising a base having four like open top transparent receptacles upstanding from the base and oriented to conveniently receive separate samples of milk from the four udder quarters of a cow, a circular collar on the underside of said base having a resilient plug therein having a flat lower end face, said plug having four conduits comprising apertures therein extending upwardly from the end face and arranged around on a circle, and said base having four connecting ports, each one leading from the bottom of one receptacle to a plug aperture, respectively, said lower portion of the apparatus having a base, a cylindrical chamber affixed to the underside thereof, a plug for the lower end of the chamber, and means for venting and applying vacuum to the chamber, said lower base having an upstanding collar adapted to surround and telescopically receive the collar of the upper base, said lower base having four ports therein within the collar adapted for alignment with the apertures in said plug and a flat surface adapted to receive a filter disk overlying said last named ports, a filter disk overlying said last named ports and held against the flat surface of the lower base by the flat end face of the apertured plug, with the plug apertures and the ports of the lower base in alignment, and means to indicate the angular relation of the upper portion in respect to the lower portion, when the respective collars are telescopically disposed, and the plug apertures and lower base ports are aligned, whereby four samples of like quantity from the separate udder quarters of a cow in the four receptacles may be subjected to differential pressure to urge such milk samples through the filter disk to compare the rate of flow into the chamber of a sample in one receptacle with the rate of flow into the chamber of the other receptacle samples.

References Cited
UNITED STATES PATENTS

| | | | |
|---|---|---|---|
| 1,248,232 | 11/1917 | Wilson | 73—61 |
| 3,102,418 | 9/1963 | Schalm et al. | 73—61 |
| 3,267,724 | 8/1966 | Roman | 73—61 |
| 3,289,633 | 12/1966 | Simons | 119—14.17 X |
| 3,319,792 | 5/1967 | Leder et al. | 210—406 X |

LOUIS R. PRINCE, Primary Examiner

J. W. ROSKOS, Assistant Examiner

U.S. Cl. X.R.
119—14.53